(12) United States Patent
Segawa

(10) Patent No.: US 7,751,084 B2
(45) Date of Patent: Jul. 6, 2010

(54) IMAGE PROCESSING APPARATUS, IMAGE PROCESSING METHOD, AND PROGRAM

(75) Inventor: Hiroyuki Segawa, Kyoto (JP)

(73) Assignee: Dainippon Screen Mfg. Co., Ltd., Kyoto (JP)

( * ) Notice: Subject to any disclaimer, the term of this patent is extended or adjusted under 35 U.S.C. 154(b) by 656 days.

(21) Appl. No.: 11/710,915

(22) Filed: Feb. 27, 2007

(65) Prior Publication Data

US 2007/0229911 A1 Oct. 4, 2007

(30) Foreign Application Priority Data

Mar. 28, 2006 (JP) ............................. 2006-087385

(51) Int. Cl.
 *H04N 1/405* (2006.01)
(52) U.S. Cl. ...................... 358/1.9; 358/1.18; 358/3.15
(58) Field of Classification Search ................. 358/1.9, 358/2.1, 3.15, 3.21, 3.24–3.27, 1.18; 382/199–200, 382/266, 269
See application file for complete search history.

(56) References Cited

U.S. PATENT DOCUMENTS

2001/0055130 A1 12/2001 Geurts et al.

FOREIGN PATENT DOCUMENTS

EP 0 533 411 A2 3/1993

JP 07222199 A * 8/1995

OTHER PUBLICATIONS

European Search Report issued in European Patent Application No. 07001921.1-1228/1841200, dated Sep. 30, 2008.
ADOBE Systems Inc: "Postscript Language Reference third edition" Internet Citation 1999, pp. 439-454.
Quarkpress: Desktop Tech Support: "Trapping: Spot and Process Colors (Cross-platform)" Internet Citation, Nov. 1, 2005 pp. 1-3.

* cited by examiner

*Primary Examiner*—Thomas D Lee
*Assistant Examiner*—Stephen M Brinich
(74) *Attorney, Agent, or Firm*—McDermott Will & Emery LLP

(57) ABSTRACT

An image processing apparatus of the present invention compares the density value of K-color at each position around a blank character with a reference density value, thereby deciding whether it is necessary to remove other color components. Based on the result of a decision, the apparatus removes the color components. Thus, other color components can be removed only in the region where the density value of K-color is high. Hence, when a background image is an uneven image, a kickback processing can be performed suitably around the blank character.

11 Claims, 9 Drawing Sheets

PROCESSED IMAGE (WHEN INPUTTED)

M-PLATE IMAGE           K-PLATE IMAGE

PROCESSED IMAGE (AFTER PROCESSING)

PROCESSED IMAGE (CONVENTIONAL)

IMAGE PROCESSING APPARATUS, IMAGE PROCESSING METHOD, AND PROGRAM

BACKGROUND OF THE INVENTION

1. Field of the Invention

The present invention relates to an image processing apparatus, an image processing method, and a program, which are adapted to perform a kickback processing with respect to an image to be processed (hereinafter referred to as a processed image) where a figure having a high lightness is placed in a background image using rich black or the like.

2. Description of the Background Art

Conventionally, an image for a color printing is composed of a plurality of color components (for example, the color components of C (cyan), M (magenta), Y (yellow), and K (black)), and can be printed on a printing paper through printing plates made for the color components, respectively. When black is expressed in the image for the color printing, not only K-color but also other color components may be added to express a deeper black (so-called "rich black").

In cases where in this image for the color printing, a blank character is placed in a background image using rich black, the color components other than K-color (e.g., C, M, and Y) may jut out into the blank character by a slight misregistration of the printing positions of the respective printing plates on the printing paper. In order to prevent this disadvantage, in the process of an image processing before making plates, there is performed the processing for removing color components other than K-color in a region of a predetermined width around the blank character (hereinafter referred to as a "kickback processing"). The kickback processing can be handled as a kind of trapping being an image processing for preventing image deterioration due to plate misregistration.

In the conventional kickback processing, however, the color components other than K-color are removed uniformly in the region around the blank character when the background image is an uneven image (namely when the density value of the K-color in the background image is not constant). Therefore, the blank character in the region having a low density value of K-color will seem bold, and in some cases, this is unfavorable in terms of the appearance of the image. For example, when performing a kickback processing to a processed image 30, as shown in FIG. 6, if the M-color around a character 32 is removed, the upper half of the character 32 will seem bold in the processed image 30, as shown in FIG. 13.

This is a problem generally arises when the kickback processing is performed to a processed image where a figure having a high lightness is placed in a background image composed of a main color component having a relatively low lightness and a sub color component having a relatively high lightness, rather than a problem peculiar to the case where the blank character is placed in the background image using rich black.

SUMMARY OF THE INVENTION

The present invention is directed to an image processing apparatus performing a processing to a processed image where a figure is placed in a background image composed of a main color component having a relatively low lightness and a sub color component having a relatively high lightness, so as to remove the sub color component around the figure.

According to an embodiment of the present invention, the image processing apparatus includes: a deciding part to decide whether it is necessary to remove the sub color component based on a density value of the main color component, at each position around the figure; and a removing part to remove the sub color component based on a result of a decision in the deciding part.

The sub color component can be removed only in the location where the density value of the main color component satisfies a predetermined condition. Hence, when the background image is an uneven image, the kickback processing can be performed suitably around the figure.

Preferably, the deciding part decides whether it is necessary to remove the sub color component by comparing a density value of the main color component with a reference density value, at each position around the figure.

The sub color component can be removed only in the location where the density value of the main color component is high. Hence, when the background image is an uneven image, the kickback processing can be performed suitably around the figure.

Preferably, the image processing apparatus further includes a reference density value setting part to set the reference density value.

The reference density value can be set to an optimum value according to the type of printing and the type of a processed image.

Preferably, the image processing apparatus further includes: a comparing part to compare a ratio of a region around the figure where a density value of the main color component is the reference density value or higher, with a reference ratio; and a cancel part to cancel a removal processing in the removing part, based on a result of a comparison in the comparing part.

The processing to be performed around a figure can be cancelled as needed. This enables to comply with cases where a partial processing around the figure will rather degrade the quality of appearance.

Preferably, the image processing apparatus further includes a reference ratio setting part to set the reference ratio.

The reference ratio can be set to an optimum value according to the type of printing and the type of a processed image.

Preferably, the image processing apparatus further includes an extracting part to extract a closed region containing the figure and a region of a predetermined width around the figure. The deciding part and the removing part perform processes to the closed region extracted by the extracting part, respectively.

This eliminates the necessity for performing the process throughout the entire processed image, thus improving the efficiency of the image processing.

Preferably, the figure is a figure having a high lightness.

It is capable of achieving a kickback processing for performing a processing to a figure of a high lightness containing a blank figure.

The present invention is also directed to an image processing method of performing a processing to a processed image where a figure is placed in a background image composed of a main color component having a relatively low lightness and a sub color component having a relatively high lightness, so as to remove the sub color component around the figure.

The present invention is further directed to a program for performing a processing to a processed image where a figure is placed in a background image composed of a main color component having a relatively low lightness and a sub color component having a relatively high lightness, so as to remove the sub color component around the figure.

Accordingly, an object of the present invention is to provide an image processing apparatus, an image processing method, and a program, each of which enables a kickback processing to be performed suitably around a figure when a background image is an uneven image.

These and other objects, features, aspects and advantages of the present invention will become more apparent from the following detailed description of the present invention when taken in conjunction with the accompanying drawings.

DESCRIPTION OF THE PREFERRED EMBODIMENTS

Preferred embodiments of the present invention will be described below with reference to the accompanying drawings.

<1. Configuration of Image Processing Apparatus>

Figure 1:
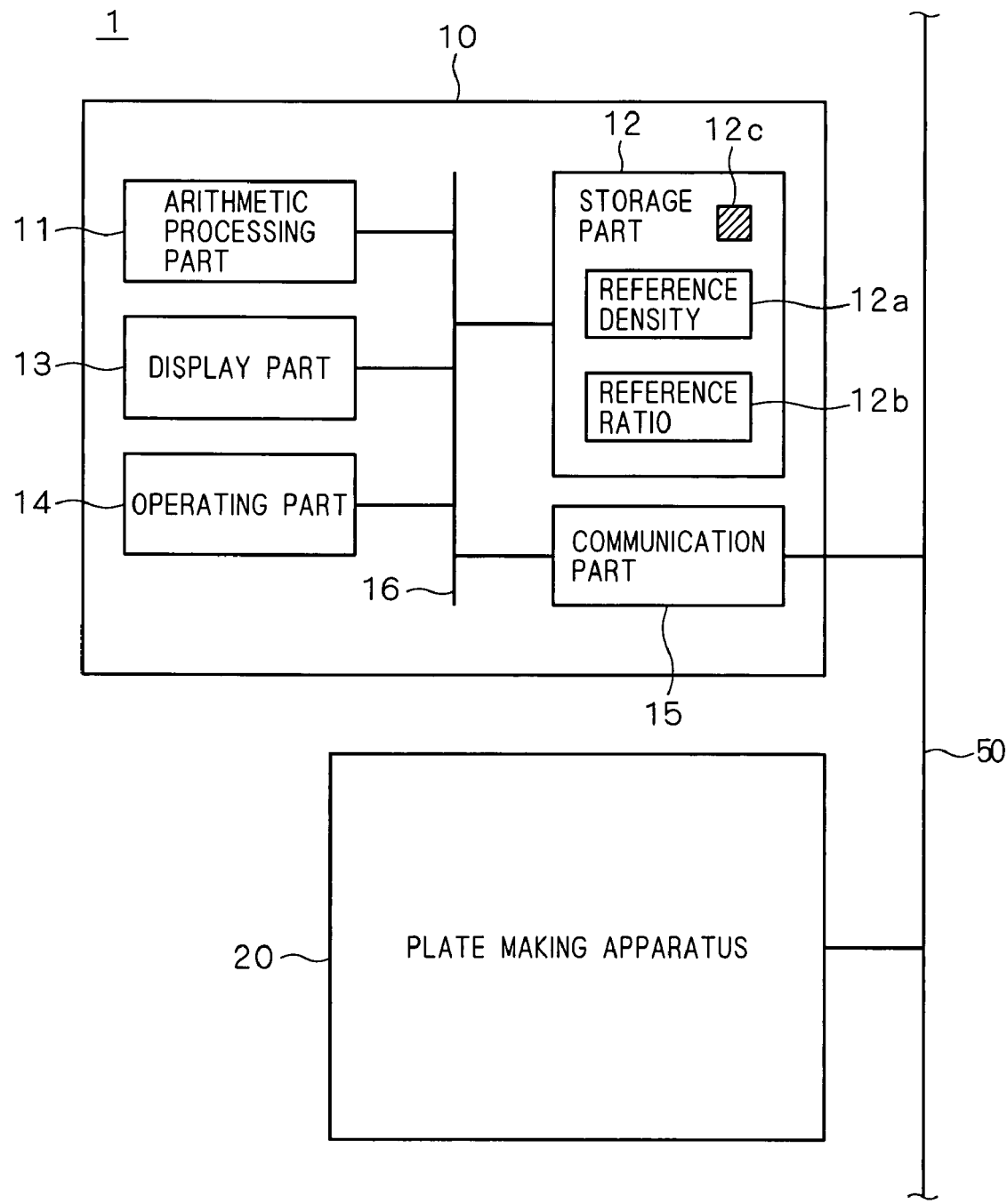
FIG. 1 is a block diagram showing a plate making system including an image processing apparatus.

FIG. 1 is a block diagram showing the configuration of a plate making system 1 including an image processing apparatus 10 according to a preferred embodiment of the present invention. The plate making system 1 consists mainly of the image processing apparatus 10 and a plate making system 20, and these apparatuses are connected over a LAN 50. The image processing apparatus 10 is composed of a general computer provided with an arithmetic processing part 11, a storage part 12, a display part 13, an operating part 14, and a communication part 15. These parts are electrically connected via a bus line 16, so that they can mutually perform sending and receiving of data.

The arithmetic processing part 11 is composed of a CPU or an MPU, and executes an image processing by performing a predetermined arithmetic processing based on a program 12c stored in the storage part 12, and an instruction inputted through the operating part 14. Specifically, the arithmetic processing part 11 executes various processing to be described later, such as an ID draw processing, the registration of related figures, the application of a trapping rule, and the creation of trapping figures. The storage part 12 is made up of a ROM, a RAM, a hard disk, and the like, and preserves various data necessary for an image processing. For example, the storage part 12 preserves information of a reference density value 12a and a reference ratio 12b which will be described later. The storage part 12 also stores the program 12c necessary for the arithmetic processing part 11 to execute the image processing.

The display part 13 is made up of display devices such as a liquid crystal display and a CRT, and displays images and a variety of information to the operator. The operating part 14 is made up of a keyboard, a mouse, and the like, and accepts an operation input from the operator. For example, the operator can arbitrarily set the values of the reference density value 12a and the reference ratio 12b preserved in the storage part 12 by operating the operating part 14. The communication part 15 has an interface function for connecting the image processing apparatus 10 to the LAN 50. For example, a processed image transmitted over the LAN 50 is inputted via the communication part 15 to the image processing apparatus 10. The image subjected to the image processing in the image processing apparatus 10 is then outputted via the communication part 15 to the LAN 50.

The plate making apparatus 20 records the processed image after being subjected to the image processing, in a printing plate for each color component, and makes a plurality of printing plates used in a color printing. The plate making apparatus 20 is made up of, for example, a drum rotating in a horizontal scanning direction while holding a printing plate, and a recording head shifting in a vertical scanning direction while emitting a laser beam to the printing plate.

<2. Image Processing by Image Processing Apparatus>

The image processing performed in the above-mentioned image processing apparatus 10 will next be described with reference to the flow charts in FIGS. 2 to 5, and the image examples in FIGS. 6 to 12. A processed image to be processed in the following image processing is an image for a color printing where a plurality of objects (figures) are placed, and this image is inputted to the plate making system 1 as an image described in the format of Portable Document Format, PostScript (registered trademark), or the like.

Figure 2:
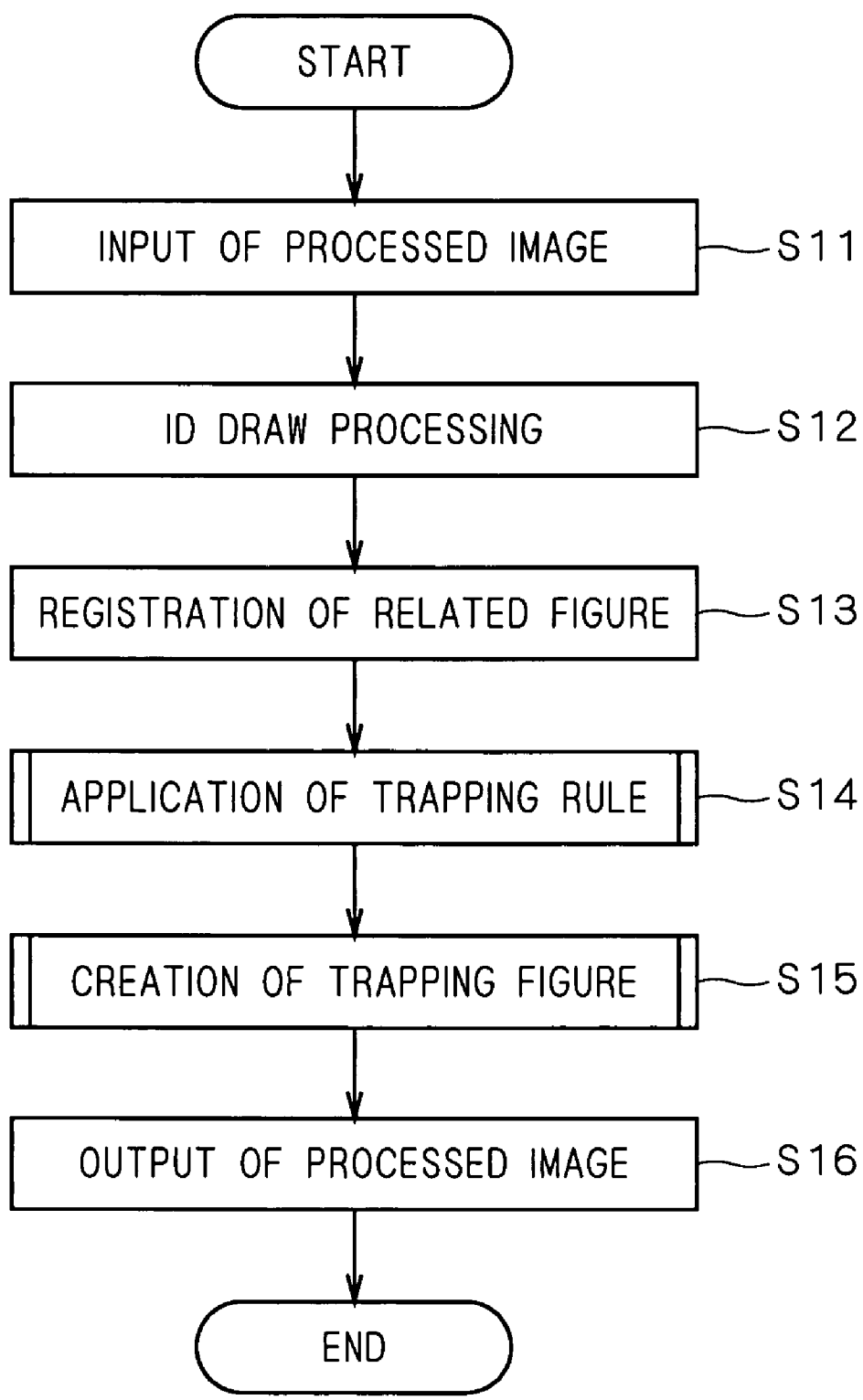
FIG. 2 is a flow chart showing the overall flow of an image processing.

FIG. 2 is a flow chart showing the overall flow of the image processing in the image processing apparatus 10. When a processed image is inputted to the plate making system 1, the inputted processed image is transmitted over the LAN 50 and inputted via the communication part 15 to the image processing apparatus 10 (step S11). The image processing apparatus 10 checks whether or not the contents of descriptions in the format and header of the processed image are suitable for the succeeding image processing. If the image processing apparatus 10 decides they are not suited for the image processing, the apparatus 10 rejects the input of the processed image, and displays the result on the display part 13. If decided they are suited for the image processing, it accepts the input of the processed image.

Figure 6:
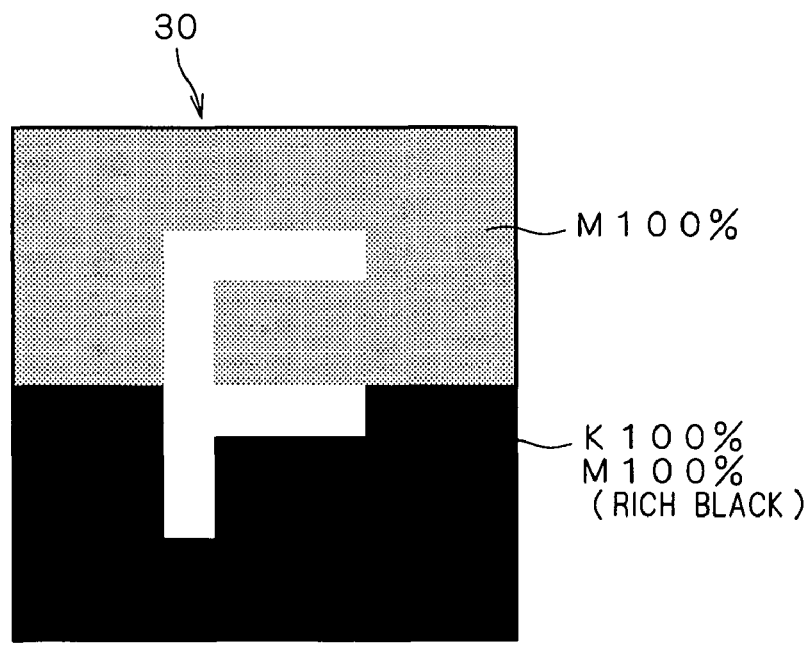
FIG. 6 is a diagram showing an example of a processed image to be inputted to the image processing apparatus.
Figure 7:
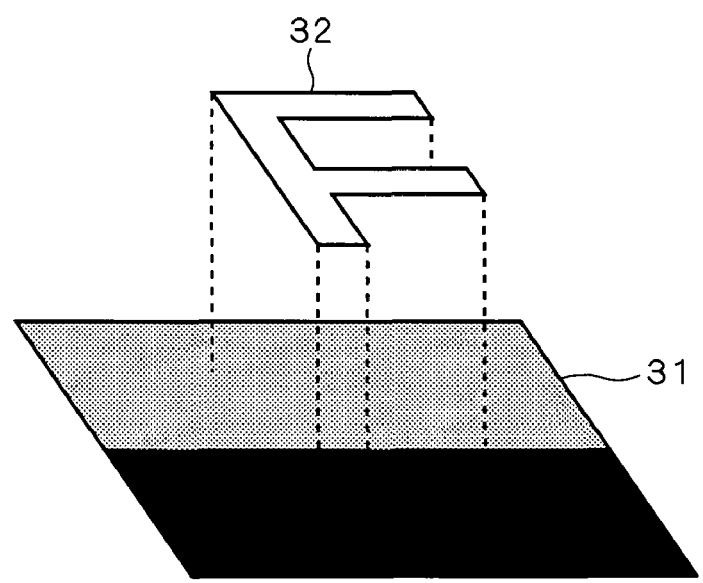
FIG. 7 is a diagram showing the processed image being exploded per object.
Figure 8:
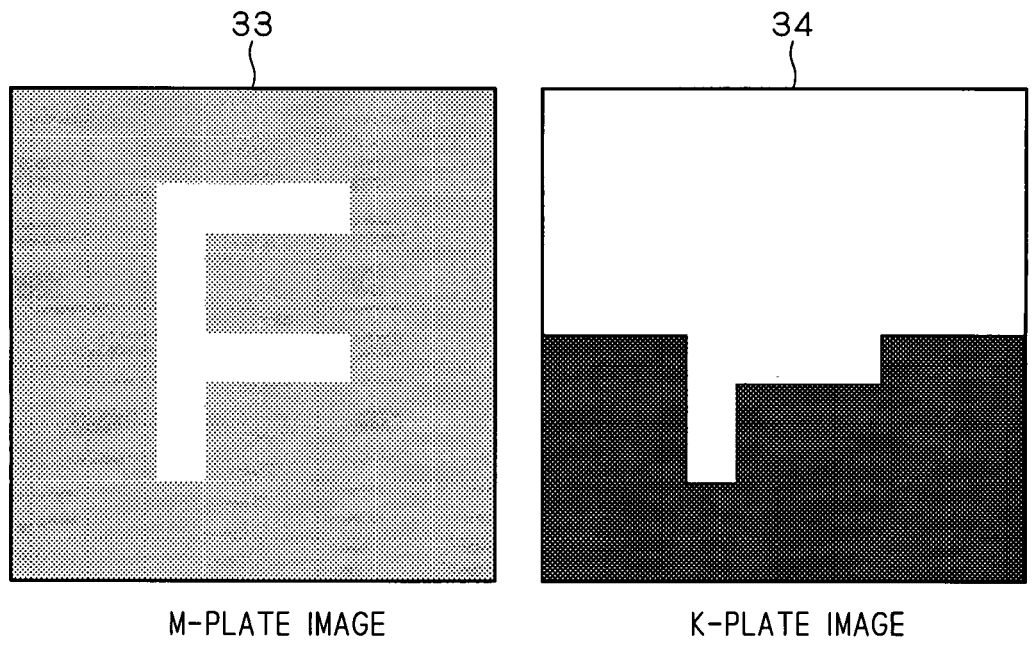
FIG. 8 is a diagram showing the processed image being exploded per color component.

FIG. 6 is a diagram showing an example of the processed image inputted to the image processing apparatus 10. The processed image 30 in FIG. 6 is an image where an "F"-shaped blank character 32 is placed on the upper side of a background image 31, as shown in a conceptual diagram of FIG. 7. Rich black composed of a 100% of M-color and a 100% of K-color is used in the lower half of the background image 31, and only a 100% of M-color is used in the upper half of the background image 31. That is, the background image 31 is an "uneven image" where the density value of K-color is variable. The character 32 does not have the color component constituting the background image 31, and is a "blank figure" having a high lightness. When the color components of the processed image 30 are decomposed per color component, an M plate image 33 and a K plate image 34 can be created as shown in FIG. 8.

Figure 9:
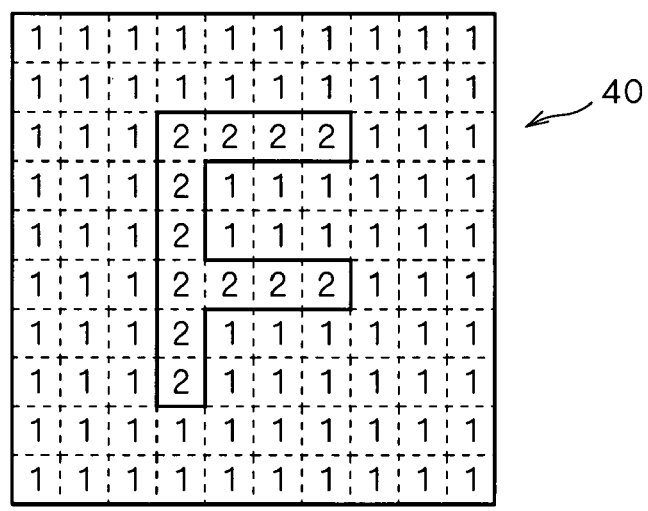
FIG. 9 is a diagram showing an example of a bit map to be created by an ID draw processing.

Returning to FIG. 2, the image processing apparatus 10 performs an ID draw processing in respect to the inputted processed image (step S12). In the ID draw processing, the image processing apparatus 10 provides an ID for identification to each object constituting the processed image, and describes the ID of each object in the pixel occupied by the object on a bit map. When performing the ID draw processing to the processed image 30 of FIG. 6, it is assumed that an ID of "1" is assigned to the background image 31 of the processed image 31 being an object placed at a relatively lower position in the processed image 30, and an ID of "2" is assigned to the character 32 being an object placed at a relatively upper position. Consequently, as shown in FIG. 9, the ID of "1" is described in the pixel corresponding to the background image 31, and the ID of "2" is described in the pixel corresponding to the background image 32 on a bit map 40.

Subsequently, the image processing apparatus 10 registers adjacent lower objects (relative figures) for each object constituting the image (step S13). Specifically, the apparatus 10 reads the IDs described in the respective pixels while scanning vertically and horizontally the above-mentioned bit map. If there exists a pixel in which an ID smaller than a candidate object ID is described, the apparatus 10 registers the object containing such a pixel as a relative figure. In the bit map 40 of FIG. 9, the background image 31 (ID: 1) is registered as a relative figure with respect to the character 32 (ID: 2).

Figure 3:
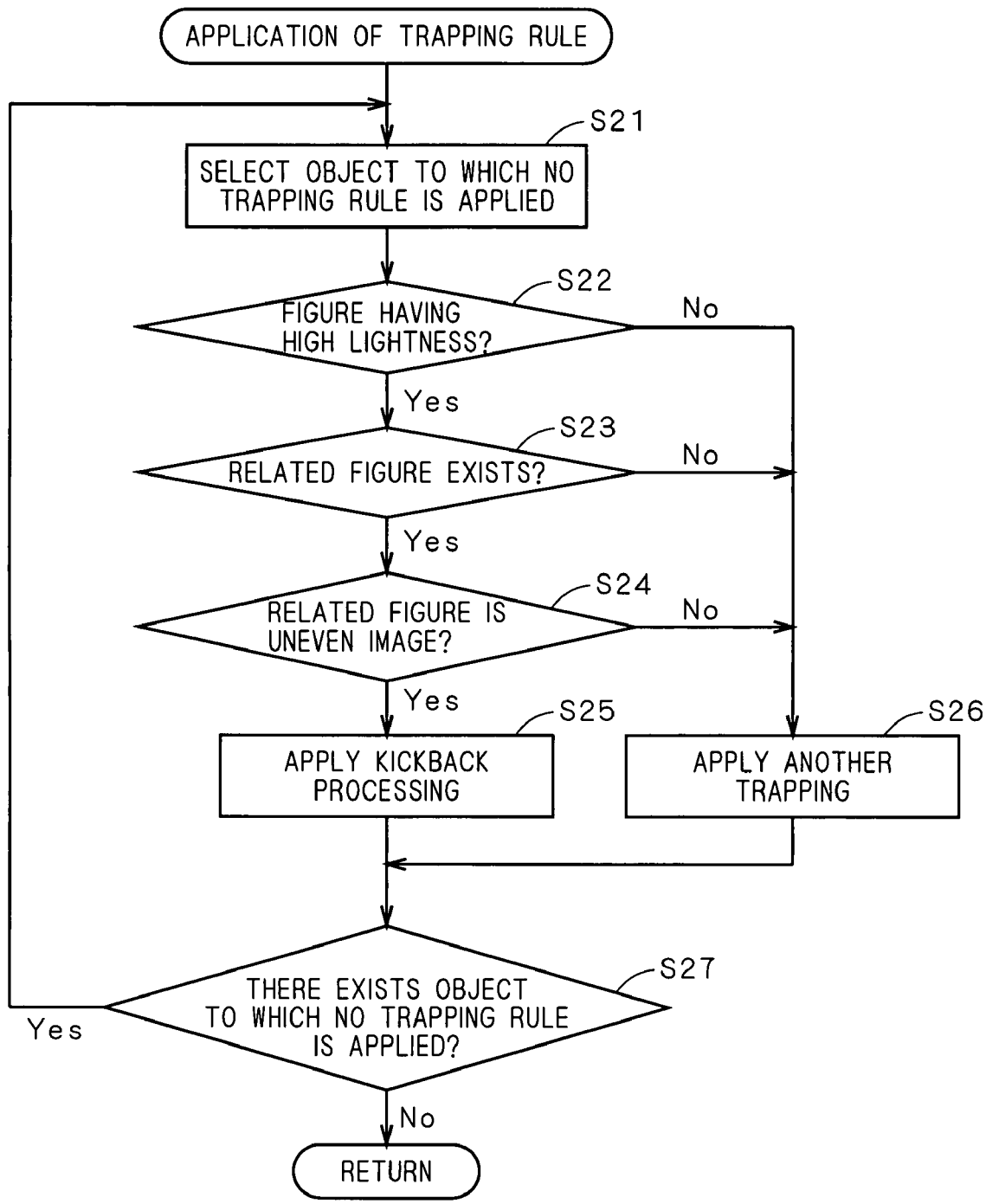
FIG. 3 is a flow chart showing the flow of the process of applying a trapping rule.

Thereafter, the image processing apparatus 10 decides the type of trapping (a trapping rule) that should be applied to between the object constituting the processed image and its related figure (step S14). FIG. 3 is a flow chart showing in more detail the flow of the process of applying the trapping rule. First, the image processing apparatus 10 selects an object to which no trapping rule is applied (step S21). The apparatus 10 then checks the following items as to whether this object is a figure having a high lightness (step S22); whether it is a relative figure registered in respect to this object (step S23); and whether the relative figure of this object is an uneven image (step S24). When this object satisfies the requirements in all of these items, the apparatus 10 selects "kickback processing" as a trapping applied to between this object and the relative figure (step S25). On the other hand, if there exists at least one item not satisfied, the apparatus 10 selects "another trapping" as a trapping applied to between this object and the relative figure (step S26).

For example, in the application of the trapping rule to the processed image 30, when the character 32 is selected in step S21, the character 32 is the blank figure having a high lightness, and the background image 31 is registered as a relative figure in respect to the character 32, and the background image 31 is an uneven image. Therefore, the "kickback processing" can be selected as the trapping applied to between the character 32 and the background image 31. Then, the image processing apparatus 10 checks whether there remains any object to which no trapping rule has been applied (step S27). If remained, the procedure is returned to step S21 to apply the trapping rule to the remaining object.

Figure 4:
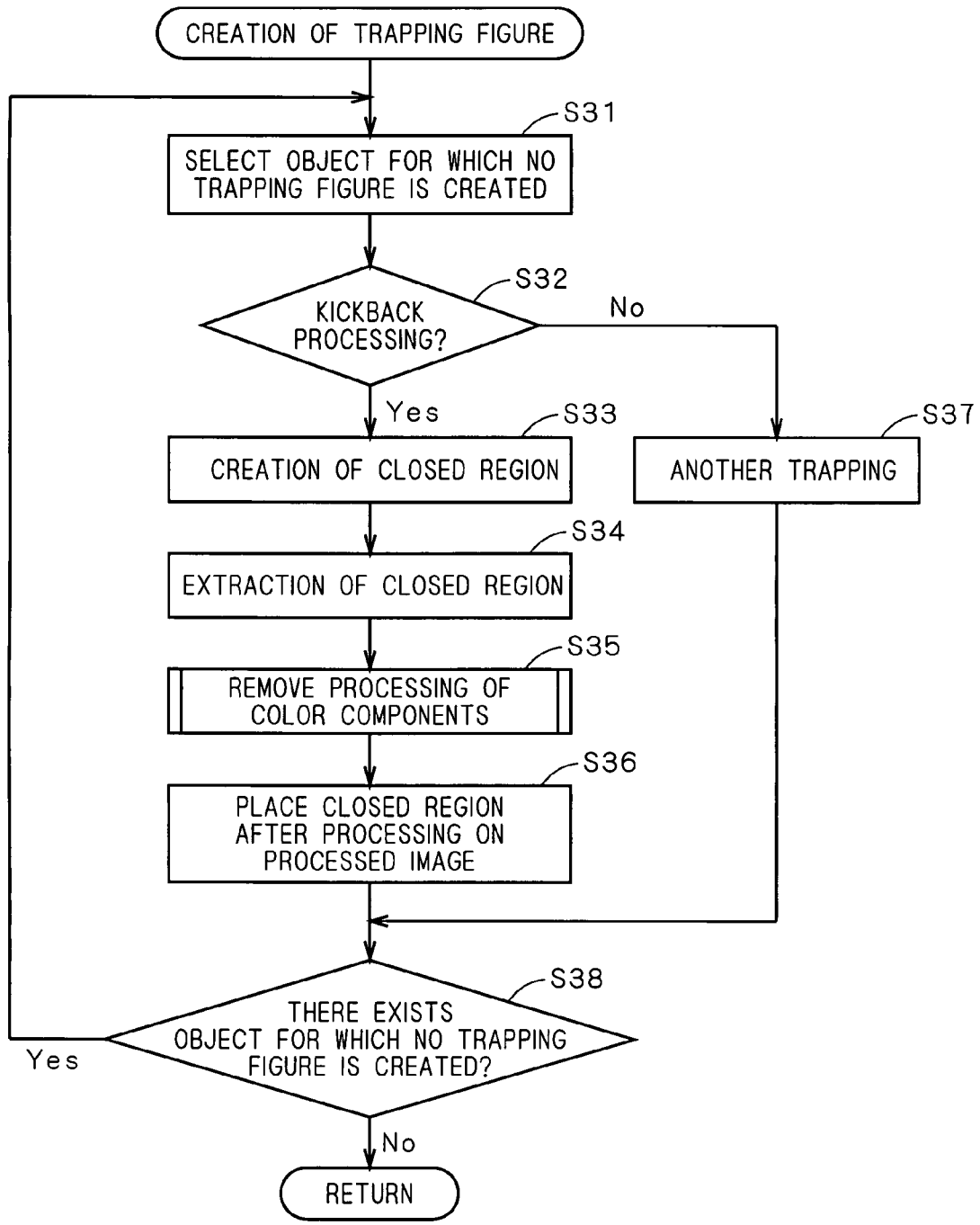
FIG. 4 is a flow chart showing the flow of the process of creating a trapping figure.

If any object to which no trapping rule has been applied is not left in step S27, the procedure is returned to the flow chart in FIG. 2, and the image processing apparatus 10 creates the trapping figures of the respective objects constituting the processed image (step S15). FIG. 4 is a flow chart showing in more detail the flow of the process of creating the trapping figures. First, the image processing apparatus 10 selects an object for which no trapping figure is created (step S31), and refers to the type of the trapping rule applied to the selected object (step S32). When the type of the trapping rule applied thereto is "kickback processing," the apparatus 10 performs the kickback processing by executing the following steps S33 to S36.

Figure 10:
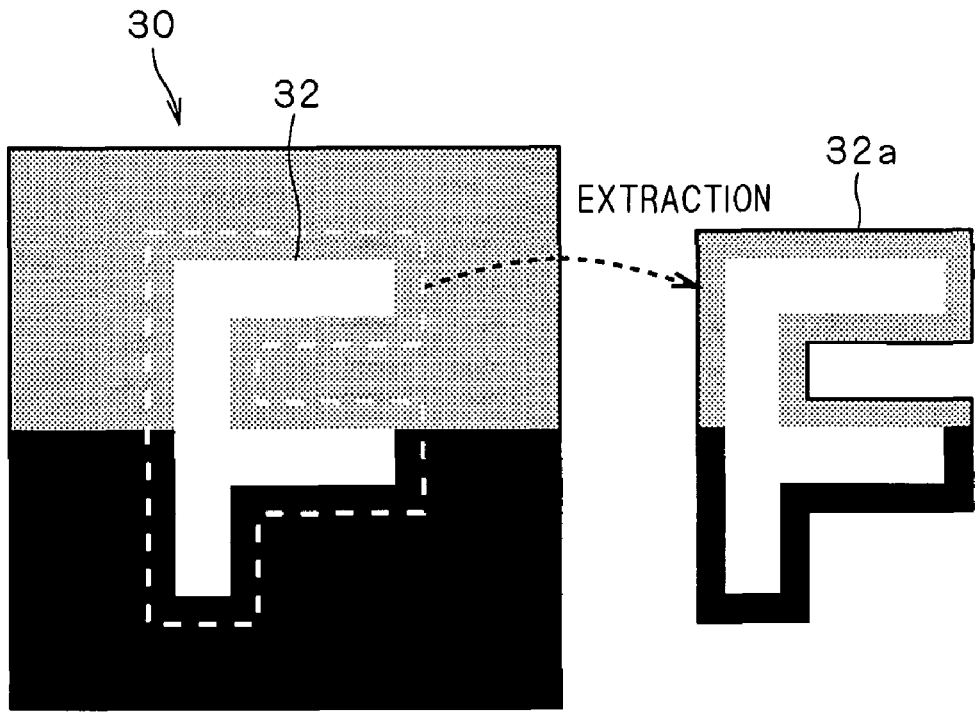
FIG. 10 is a diagram showing extraction of a closed region from the processed image.

In the kickback processing, there is first created a closed region containing the selected object and a region of a predetermined width around the object (step S33), and the closed region is extracted from the processed image (step S34). For example, when the character 32 is selected in the processed image 30, as shown in FIG. 10, a closed region 32a containing the character 32 and the region of a predetermined width around the character 32 can be created, and the closed region 32a is then extracted from the processed image 30.

Figure 5:
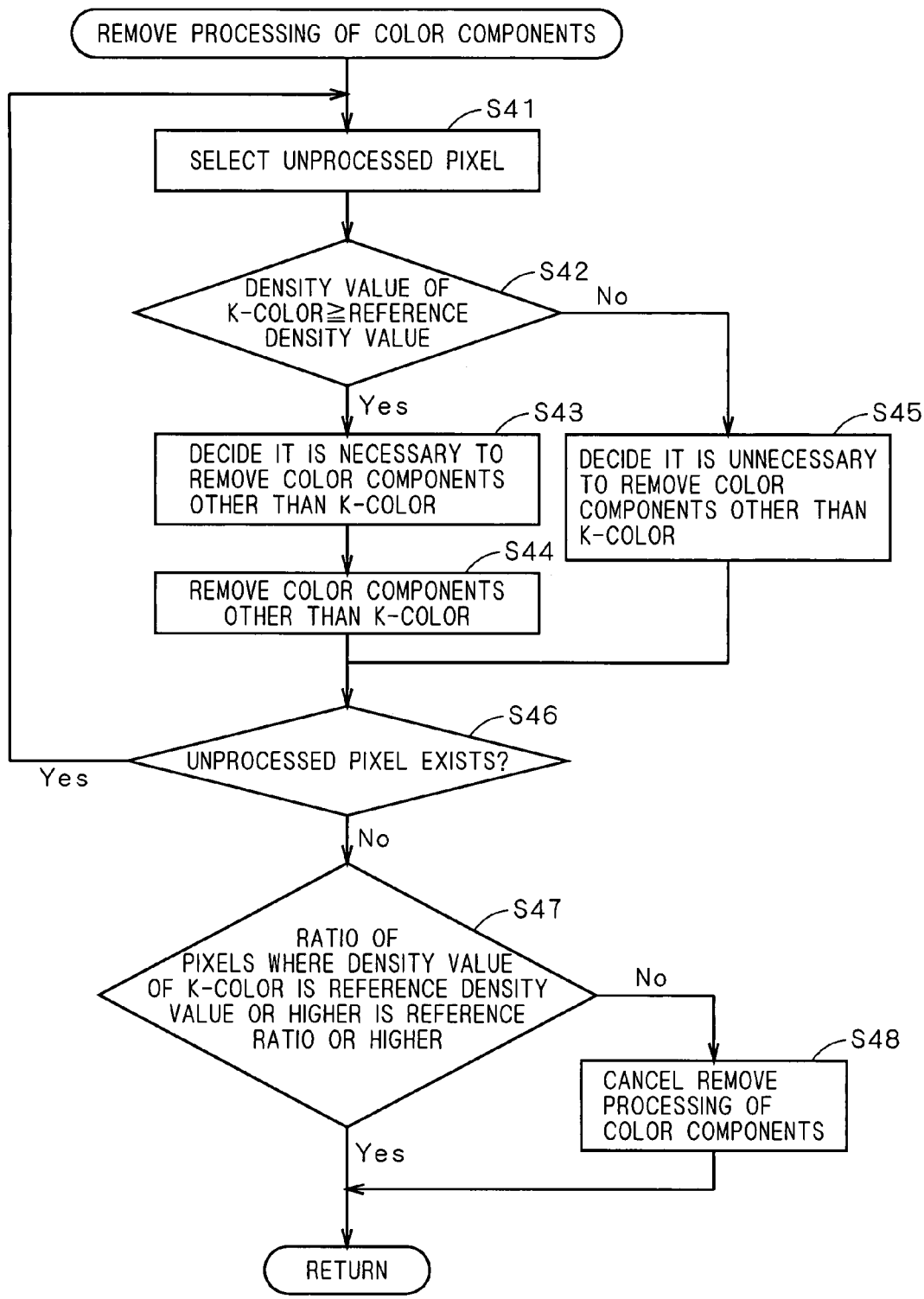
FIG. 5 is a flow chart showing the flow of the process of removing color components.

To the closed region so extracted, the image processing apparatus 10 performs the process of removing color components (step S35). FIG. 5 is a flow chart showing in more detail the flow of the process of removing color components. The image processing apparatus 10 firstly selects an unprocessed pixel within the closed region (step S41), and compares the density value of K-color corresponding to a color component having a relatively low lightness in the selected pixel, with a reference density value 12a stored in the storage part 12 (step S42). When the density value of the K-color of the selected pixel is the reference density value 12a or higher, the apparatus 10 decides it is necessary to remove the color components other than the K-color in the pixel (step S43), and then removes the density value of the color components other than the K-color (step S44). On the other hand, when the density value of the K-color of the selected pixel is lower than reference density value 12a, the apparatus 10 decides it is unnecessary to remove the color components other than the K-color in the pixel (step S45). Thus, the kickback processing can be selectively performed only in the region where the density value of the K-color is high.

Figure 11:
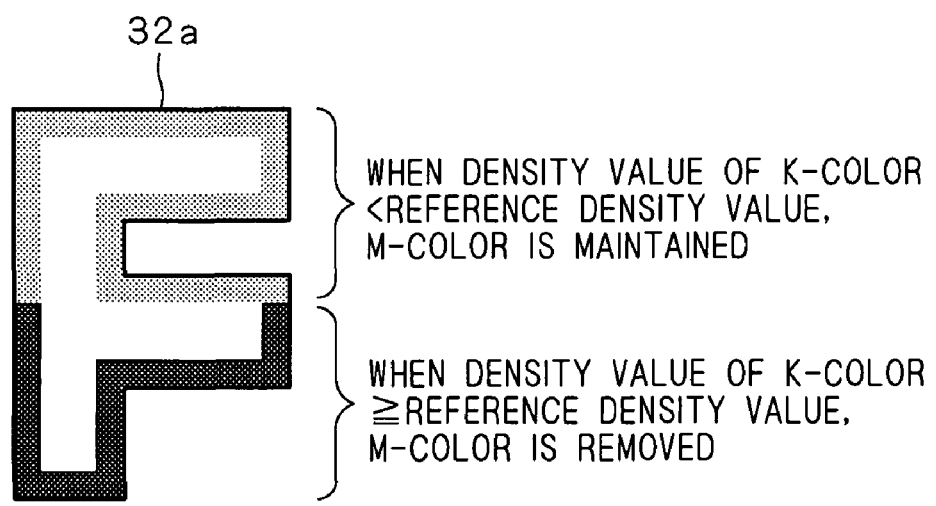
FIG. 11 is a diagram showing the process of removing color components from the processed image.

Assuming, for example, that the reference density value 12a is set to "95%," the process of removing color components in respect to the closed region 32a will be described below with reference to FIG. 11. When the image processing apparatus 10 selects the pixel of rich black in the closed region 32a, the density value of K-color in this pixel is 100%, namely above the reference density value 12a, so that the apparatus 10 decides it is necessary to remove M-color. Hence, the density value of the M-color of this pixel is written to 0%. When the apparatus 10 selects the pixel of M-color in the closed region 32a, the density value of K-color in this pixel is 0%, namely below the reference density value 12a, so that the apparatus 10 decides it is unnecessary to remove the M-color. Hence, the density value of the M-color in this pixel retains 100%.

Thereafter, the image processing apparatus 10 checks whether any unprocessed pixel remains within the closed region (step S46). If remained, the procedure is returned to step S41 to perform the process of removing color components. On the other hand, if no unprocessed pixel remains, the apparatus 10 then calculates a ratio of pixels where the density value of K-color is the reference density value 12a or higher in all of the pixels around the blank figure within the closed region, and compares the ratio so calculated with the reference ratio 12b stored in the storage part 12 (step S47). When the ratio of the pixels where the density value of K-color is the reference density value 12a or higher is the reference ratio 12b or higher, the apparatus 10 maintains the process of removing color components performed in the above-mentioned step S44. On the other hand, when the ratio of the pixels where the density value of K-color is the reference density value 12a or higher is below the reference ratio 12*b*, the apparatus 10 cancels the process of removing color components performed in the above-mentioned step S44 (step S48). That is, the image of the closed region after subjected to the process of removing color components is cancelled, and the image of the closed region before the process of removing color components is returned.

Figure 12:
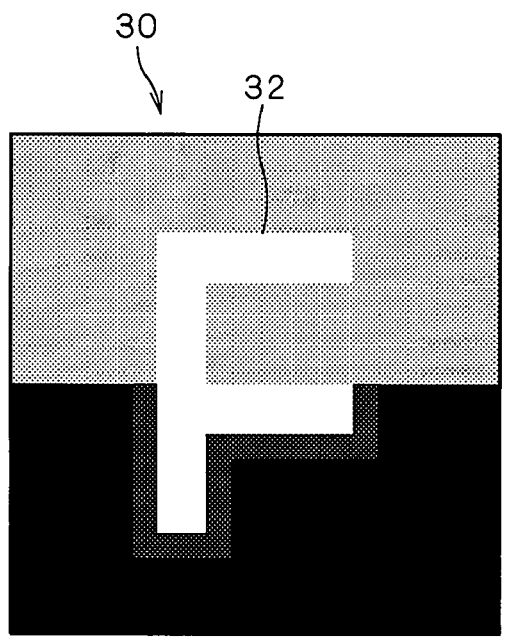
FIG. 12 is a diagram showing an example of the processed image after being subjected to the image processing.
Figure 13:
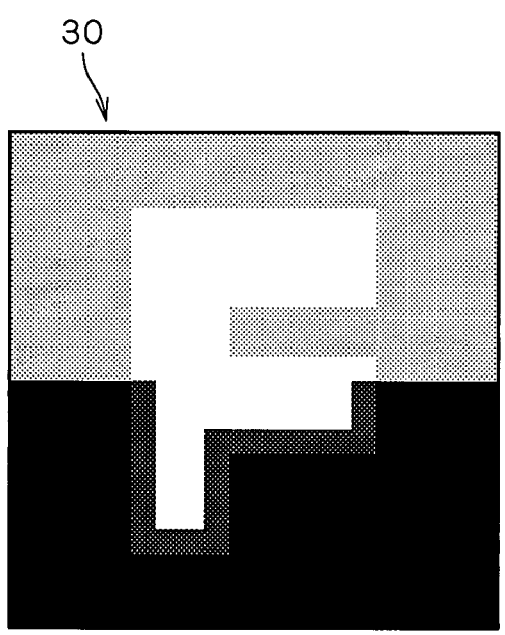
FIG. 13 is a diagram showing a processed image after being subjected to a conventional image processing.

Thereafter, the procedure is returned to the flow chart of FIG. 4, and the image processing apparatus 10 places the closed region thus processed on the processed image (step S36). This results in the image where the kickback processing has been performed only in the region having a high density value of K-color around the object in the processed image. For example, by placing the closed region 32*a* processed as shown in FIG. 11 on the processed image 30, the image can be creased as shown in FIG. 12 where M-color has been removed only from around the lower half of the character 32. Since no M-color has been removed from around the upper half of the character 32, there is no likelihood that the upper half of the character 32 will seem bold, thereby causing no disadvantage in appearance.

On the other hand, when the trapping rule applied to the selected object is "another trapping" in the above-mentioned step S32, the trapping under the trapping rule is performed (step S37). Then, the image processing apparatus 10 checks whether there remains any object for which no trapping figure is created (step S38). If remained, the procedure is returned to step S31 to create a trapping figure in respect to the remaining object.

If such an object does not remain in step S38, the procedure is returned to the flow chart in FIG. 2, and the image processing apparatus 10 outputs the processed image after subjected to the image processing (step S16). The processed image is then transmitted through the communication part 15, and transferred to the plate making apparatus 20 over the LAN 50. The plate making apparatus 20 creates a printing plate per color component, based on the received processed image.

As discussed above, the image processing apparatus 10 decides whether it is necessary to remove other color components by comparing the density value of K-color at each position around the character, with the reference density value 12*a*. Based on the result of a decision, the apparatus 10 performs the process of removing the color components. This enables the process of removing color components to be performed only in the region where the density value of K-color is high. Accordingly, when the background image is an uneven image, the kickback processing can be performed suitably around the character.

Further, in the image processing apparatus 10, the reference density value 12*a* preserved in the storage part 12 can be set arbitrarily by the operator's input operation through the operating part 14. Hence, the reference density value can be set to the optimum value according to the type of printing and the type of a processed image.

The image processing apparatus 10 also compares the ratio of the region where the density value of K-color around the character is the reference density value 12*a* or higher, with the reference ratio 12*b*, and based on the result of a comparison, cancels the process of removing color components. Consequently, the kickback processing to be executed partially around a character can be cancelled as needed. This enables to comply with the cases where the partial kickback processing around the character may rather degrade the quality of appearance.

Further, in the image processing apparatus 10, the reference ratio 12*b* preserved in the storage part 12 can be set arbitrarily by the operator's input operation through the operating part 14. Hence, the reference ratio can be set to the optimum value according to the type of printing and the type of a processed image.

Furthermore, the image processing apparatus 10 extracts the closed region containing a character and the region of a predetermined width around the character, and performs the process of deciding, and the process of removing color components on the extracted closed region. This eliminates the necessity for performing the processing throughout the entire processed image, thereby improving the efficiency of the image processing.

<3. Modifications>

While the preferred embodiment of the present invention has been described above, the present invention is not limited to this. For example, though the above-mentioned processed image 30 is one where the blank character 32 is placed in the background image composed of K-color and M-color, a special color having a low lightness may be used instead of the K-color. Alternatively, not only M-color but also C-color and Y-color may be used. That is, the background image may be composed of a main color component having a relatively low lightness (such as K-color, a special color, or the like), and a sub color component having a relatively high lightness (such as C-color, M-color, Y-color, or the like). The figure placed in the background image should not be limited to the above-mentioned character, and a blank figure or a stroke may be used. In cases where a plurality of sub color components are used, part of the sub color components may remain in the figure. Of course, the number of figures placed in a processed image should not be limited to one, and a plurality of figures may be placed.

Although the above-mentioned image processing apparatus 10 decides whether it is necessary to remove other color components by comparing the density value of K-color with the reference density value 12*a*, the process of deciding in the present invention is not necessarily required to depend upon the comparison with the reference density value 12*a*. For example, at each position around a figure, the balance of the density value of a main color component and the density value of a sub color component may be checked to decide, based on the result, whether it is necessary to remove the sub color component. That is, the process of deciding in the present invention may be based on at least the density value of the main color component.

While the invention has been shown and described in detail, the foregoing description is in all aspects illustrative and not restrictive. It is therefore understood that numerous modifications and variations can be devised without departing from the scope of the invention.

What is claimed is:

1. An image processing apparatus performing a processing to a processed image where a figure is placed in a background image composed of a main color component having a relatively low lightness and a sub color component having a relatively high lightness, so as to remove the sub color component around the figure, the image processing apparatus comprising:

a deciding part to decide whether it is necessary to remove the sub color component based on a density value of the main color component, at each position around the figure;

a removing part to remove the sub color component based on a result of a decision in the deciding part; and a reference density value setting part to set a reference density value, wherein the deciding part decides whether it is necessary to remove the sub color component by comparing a density value of the main color component with the reference density value, at each position around the figure;

the image processing apparatus further comprising:

a comparing part to compare a ratio of a region around the figure where a density value of the main color component is the reference density value or higher, with a reference ratio; and a cancel part to cancel a removal processing by the removing part, based on a result of a comparison in the comparing part.

2. The image processing apparatus according to claim 1, further comprising:

a reference ratio setting part to set the reference ratio.

3. The image processing apparatus according to claim 2, further comprising:

an extracting part to extract a closed region containing the figure and a region of a predetermined width around the figure, wherein the deciding part and the removing part perform processes to the closed region extracted by the extracting part, respectively.

4. The image processing apparatus according to claim 3, wherein the figure is a figure having a high lightness.

5. An image processing method of performing a processing to a processed image where a figure is placed in a background image composed of a main color component having a relatively low lightness and a sub color component having a relatively high lightness, so as to remove the sub color component around the figure, the method comprising the steps of:

(a) deciding whether it is necessary to remove the sub color component based on a density value of the main color component, at each position around the figure;

(b) removing the sub color component based on a result of a decision in the step (a); and (c) setting a reference density value, wherein the step (a) decides whether it is necessary to remove the sub color component by comparing a density value of the main color component with the reference density value, at each position around the figure;

the image processing method further comprising the steps of:

(d) comparing a ratio of a region around the figure where a density value of the main color component is the reference density value or higher, with a reference ratio; and (e) canceling a removal processing in the step (b), based on a result of a comparison in the step (d).

6. The image processing method according to claim 5, further comprising the step of:

(f) setting the reference ratio.

7. The image processing method according to claim 6, further comprising the step of:

(g) extracting a closed region containing the figure and a region of a predetermined width around the figure, wherein the step (a) and the step (b) perform processes to the closed region extracted in the step (g), respectively.

8. The image processing method according to claim 7, wherein the figure is a figure having a high lightness.

9. A computer-readable storage medium wherein a program is stored for performing a processing to a processed image where a figure is placed in a background image composed of a main color component having a relatively low lightness and a sub color component having a relatively high lightness, so as to remove the sub color component around the figure, the program directing a computer to execute the following processes of:

(a) deciding whether it is necessary to remove the sub color component based on a density value of the main color component, at each position around the figure;

(b) removing the sub color component based on a result of a decision in the process (a); and (c) setting a reference density value, wherein the process (a) decides whether it is necessary to remove the sub color component by comparing a density value of the main color component with a reference density value, at each position around the figure;

the program further directing the computer to execute the processes of:

(d) comparing a ratio of a region around the figure where a density value of the main color component is the reference density value or higher, with a reference ratio; and (e) canceling a removal processing in the process (b), based on a result of a comparison in the process (d).

10. The computer-readable storage medium according to claim 9, the program further directing the computer to execute the process of:

(f) setting the reference ratio.

11. The computer-readable storage medium according to claim 10, the program further directing the computer to execute the process of:

(g) extracting a closed region containing the figure and a region of a predetermined width around the figure, wherein the process (a) and the process (b) perform processes to the closed region extracted in the process (g), respectively.

* * * * *